(12) United States Patent
Tajima et al.

(10) Patent No.: US 6,918,460 B2
(45) Date of Patent: Jul. 19, 2005

(54) VEHICLE STEERING APPARATUS

(75) Inventors: Takamitsu Tajima, Wako (JP); Yasuharu Oyama, Wako (JP); Shoichi Sano, Arakawa-Ku (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/758,333

(22) Filed: Jan. 14, 2004

(65) Prior Publication Data

US 2004/0200662 A1 Oct. 14, 2004

(30) Foreign Application Priority Data

Jan. 16, 2003 (JP) ....................................... 2003-008426

(51) Int. Cl.⁷ ................................................ B62D 5/04
(52) U.S. Cl. ........................................ 180/402; 701/42
(58) Field of Search ............................... 180/402, 443, 180/446; 701/41, 42

(56) References Cited

U.S. PATENT DOCUMENTS

| | | | | |
|---|---|---|---|---|
| 4,984,646 A | * | 1/1991 | Sano et al. | 180/402 |
| 5,097,917 A | * | 3/1992 | Serizawa et al. | 180/402 |
| 6,655,490 B2 | * | 12/2003 | Andonian et al. | 180/402 |
| 2002/0070070 A1 | * | 6/2002 | Andonian et al. | 180/402 |

FOREIGN PATENT DOCUMENTS

| | | |
|---|---|---|
| EP | 0 333 108 A2 | 9/1989 |
| JP | 6-92250 | 4/1994 |
| JP | 6-86222 | 11/1994 |

* cited by examiner

*Primary Examiner*—Kevin Hurley
(74) *Attorney, Agent, or Firm*—Hamre, Schumann, Mueller & Larson, P.C.

(57) ABSTRACT

In a steer-by-wire vehicle steering apparatus where a steering operator member is operatively connected to steerable road wheels via an electric wire, a control section controls a steering motor in such a manner that an angle of travel direction of the vehicle and a steering angle of the steering operator agree with each other, and a resistive force generation section generates and imparts a steering resistive force to the steering operator in accordance with an actual steered angle of the steerable road wheels. Thus, the steering apparatus permits the vehicle to be steered with an increased accuracy.

4 Claims, 10 Drawing Sheets

VEHICLE STEERING APPARATUS

FIELD OF THE INVENTION

The present invention relates generally to a vehicle steering apparatus and, more particularly, to an improved steer-by-wire vehicle steering apparatus which is arranged to control an angle of travel direction of a motor vehicle in accordance with an angle of travel direction designated by a human operator via a steering operator member, such as a steering wheel, of the vehicle.

BACKGROUND OF THE INVENTION

In JP-B-6-86222 (hereinbelow "Patent Document 1"), a vehicle steering apparatus is disclosed which is constructed to control an angle of travel direction of a motor vehicle in accordance with a steering angle of a steering operator member, such as a steering wheel, of the vehicle, i.e. an angle of travel direction designated by a human operator or driver via the steering operator member. Further, in JP-A-6-92250 (herein-below "Patent Document 2"), a vehicle steering apparatus is disclosed which is constructed to control a travel direction of a motor vehicle in response to vehicle driver's operation of a steering wheel with increased stability and increased followability with respect to the steering wheel operation.

Specifically, the steering apparatus disclosed in Patent Document 1, provided with a power steering mechanism for changing an orientation or steering angle of steerable road wheels of the motor vehicle via an actuator, includes a direction designation section for, in response to operation by the human operator or driver, designating an angle of travel direction of the vehicle relative to a predetermined reference absolute azimuth, and a travel direction detection section for detecting an actual angle of travel direction of the vehicle relative to the predetermined reference absolute azimuth. The disclosed steering apparatus also includes a control section for controlling the power steering mechanism so as to eliminate a deviation or offset between the designated angle travel direction and the detected actual angle of travel direction on the basis of output signals from the steering direction designation section and travel direction detection section.

The steering apparatus disclosed in Patent Document 2 includes a steering direction designation section for designating a travel-direction variation amount of the motor vehicle relative to a predetermined reference direction, a travel direction detection section for detecting an actual travel-direction variation amount of the vehicle, and a control section for controlling a power steering mechanism so as to eliminate an offset between the designated travel-direction variation amount and the detected actual travel-direction variation amount (i.e., angle-of-travel-direction offset). Here, the control section includes a road-wheel-steering-angle designation section for outputting a signal indicative of a target road-wheel steering angle on the basis of the angle-of-travel-direction offset, and the road-wheel-steering-angle designation section is constructed to reduce the road-wheel steering angle as a traveling velocity of the motor vehicle increases.

According to each of the prior art techniques disclosed in Patent Document 1 and Patent Document 2, the steering mechanism is controlled so as to eliminate the offset between the angle of travel direction designated by the driver and the detected actual angle of travel direction relative to the predetermined reference azimuth.

FIG. 11 is a block diagram showing a general hardware setup of a control device in traditional vehicle steering apparatus. The control device 100 includes an offset calculation section 101, an angle-of-travel-direction input section (i.e., steering operator member) 102 operable by the vehicle driver to designate an angle of travel direction of the motor vehicle, a designated angle detection section 103, and an electronic control unit (ECU) 104. The control device 100 also includes a steering angle generation section (e.g., steering motor) 105, a yaw rate detection section 107, an integrator 108, a front-gazing-point detection section 109, a vehicle velocity detection section 110, another integrator 111, and an adder 112. The electronic control unit 104 includes a road-wheel steering angle gain section 113, and a steering motor drive section 114.

The offset calculation section 101 calculates a deviation or offset between a target travel course set by the vehicle driver and a value obtained by adding a front point gazed by the vehicle driver facing straight ahead ("front gazing point") detected by the front-gazing-point detection section 109 and a current position of the vehicle, and outputs a calculated offset, so that the driver can determine, on the basis of the thus-calculated offset in the travel course of the motor vehicle 106, how great the angle of travel direction to be input or designated should be.

The angle-of-travel-direction input section 102 comprises a steering operator member, such as the steering wheel, of the motor vehicle 106, which is operable by the driver to input a target angle of travel direction on the basis of the offset output from the offset calculation section 101. In the case where the steering operator member 102 is the steering wheel, an angle through which the driver has turned the steering wheel (i.e., steering angle of the steering wheel) is input or designated as the target angle of travel direction. The designated angle detection section 103 detects the target angle of travel direction input or designated by the driver through the steering operator member 102 and thereby outputs a driver-designated steering angle θ (i.e., steering angle of the steering operator member, such as the steering wheel) to the road-wheel steering angle gain section 113 of the electronic control unit 104.

On the basis of the driver-designated steering angle θ input via the designated angle detection section 103, the electronic control unit 104 outputs a drive signal to drive the road-wheel steering angle generation section (i.e. steering motor) 105.

The steering motor 105 includes a gear mechanism etc. In a case where the steering motor 105 comprises a DC motor and the steering angle of the motor vehicle 106 is controlled on the basis of a polarity and intensity value of a motor current to be supplied to the DC motor 105, the steering motor drive section 114 supplies the steering motor 105 with a predetermined motor current of a predetermined polarity corresponding to a target road-wheel steering angle δ. Where the steering motor 105 comprises a pulse motor, the steering motor drive section 114 is constructed to supply a necessary number of pulses for forward or reverse rotation of the pulse motor 105.

Travel direction of the motor vehicle 106 is varied in accordance with the target road-wheel steering angle δ generated by the steering motor 105, and resultant variation of the travel direction of the vehicle produces a yaw rate Y in the motor vehicle 106. The thus-produced yaw rate Y is detected by the yaw rate detection section 107. The integrator 108 integrates the yaw rate Y to thereby output a current angle of travel direction Ψ of the motor vehicle 106. The front-gazing-point detection section 109 detects a front point gazed by the vehicle driver that is generally determined by the angle of travel direction Ψ output from the integrator 108, and it outputs a value pertaining to a position of the front gazing point to the adder 112. The vehicle velocity detection section 110 detects a traveling velocity of the motor vehicle 106 and outputs the detected velocity to the integrator 111. The integrator 111 integrates the vehicle velocity V to thereby output a value pertaining to a current position of the vehicle 106. The adder 112 adds together the values pertaining to the position of the front gazing point and position of the motor vehicle 106, to thereby output information representative of a current travel course of the vehicle 106.

Then, the vehicle driver inputs a target angle of travel direction of the motor vehicle 106 by predicting, on the basis of the outputs of the control device 100, a deviation between a target travel course and an actual travel course of the vehicle 106. In response to the input target angle of travel direction, the control device 100 activates the steering motor 105 to impart a target road-wheel steering angle to steerable wheels of the vehicle 106 over an electric wire, so that the travel direction of the vehicle 106 is varied and thus a yaw rate corresponding to the travel direction variation is produced. Then, the angle of travel direction of the vehicle 106 is controlled in accordance with a value obtained by the integrator 108 integrating the travel direction variation.

The road-wheel steering angle gain section (i.e., road-wheel steering angle calculation section) 113 generates a signal indicative of a target road-wheel steering angle δ, on the basis of a signal indicative of the driver-input or driver-designated designated steering angle θ. This road-wheel steering angle calculation section 113 includes a conversion table, for example in the form of a ROM, prestoring various road-wheel steering angles preset in association with various possible driver-designated steering angles θ of the steering operator member. Alternatively, the road-wheel steering angle gain section 113 may be arranged to calculate a target road-wheel steering angle δ on the basis of a pre-registered function expression or in any other suitable manner.

On the basis of the target road-wheel steering angle signal output from the angle calculation section 113, the steering motor drive section 114 generates a drive signal for driving the steering motor 105.

FIG. 12 is a block diagram showing a general hardware setup of the control device in the vehicle steering apparatus disclosed in Patent Document 1 and Patent Document 2. The control device 200 includes an offset calculation section 201, an angle-of-travel-direction input section (i.e., steering operator member) 202, a designated angle detection section 203, a resistive force generating motor (or steering resistive force generating actuator) 204, and an electronic control unit (ECU) 205. The control device 200 also includes a road-wheel steering angle generation section(steering motor) 206, a yaw rate detection section 207a, an integrator 208, a travel direction detection section 209, a front-gazing-point detection section 210, a vehicle velocity detection section 211, and another integrator 212. The electronic control unit 205 includes a driver-designated angle corresponding section (designated angle gain section) 214, an offset calculation section 215, and a road-wheel steering angle calculation section including a road-wheel steering angle designation section 216 and road-wheel steering angle control section 217. The electronic control unit 205 also includes a steering motor drive section 218, an angle-of-travel-direction calculation section including an angle gain section 220 and angle calculation section 219, a steering resistive force calculation section (or steering resistive force setting section) 221, and a resistive motor drive section (or steering resistive force actuator drive section) 222. The motor vehicle 207 includes steerable road wheels, a vehicle velocity detection section 211, etc.

In the control device 200, the offset calculation section 201 calculates an offset between a target travel course set by the vehicle driver and a value obtained by adding a front point gazed by the driver (i.e., "front gazing point") facing straight ahead detected by the front-gazing-point detection section 109 and a current position of the vehicle, and outputs a calculated offset, so that the driver can determine, on the basis of the thus-calculated offset in the travel course of the motor vehicle, how great the angle of travel direction to be input or designated should be.

The angle-of-travel-direction input section 202 comprises a steering operator member, such as the steering wheel, of the vehicle, which is operable by the vehicle driver to input a target angle of travel direction. In the case where the steering operator member 202 is the steering wheel, an angle through which the driver has turned the steering wheel is input or designated as the target angle of travel direction. The designated angle detection section 203 detects the target angle of travel direction input or designated by the driver through the steering operator member 202 and thereby outputs a driver-designated steering angle θ (i.e., steering angle of the steering operator member) to the driver-designated angle corresponding section (designated angle gain section) 214 of the electronic control unit 205. The resistive force generating motor 204 is controlled by the electronic control unit 205 to give a steering resistive force to the steering operator member 202.

The electronic control unit 205 generates a drive signal for driving the steering motor on the basis of the driver-designated steering angle θ detected via the detection section 203, vehicle velocity detected by the vehicle velocity detection section 211 and travel direction (yaw angle) detected by the travel direction detection section 209, and it drives the steering motor 206 in accordance with the drive signal. Also, on the basis of the driver-designated steering angle θ and vehicle velocity, the electronic control unit 205 generates a drive signal for driving the resistive force generating motor 204.

In response to the target angle of travel direction input by the vehicle driver via the steering operator member 202, the control device 200 activates the steering motor 206 to impart a target road-wheel steering angle to the steerable wheels of the vehicle 207, so that the travel direction of the vehicle 207 is varied and thus a yaw rate corresponding to the travel direction variation is produced. Then, the angle of travel direction of the vehicle 207 is controlled in accordance with a value obtained by the integrator 208 integrating the travel direction variation.

The driver-designated angle corresponding section 214 of the electronic control unit 205 generates a signal indicative of a target value K·θ of the angle of travel direction on the basis of a signal indicative of the angle of travel direction θ detected by the detection section 203. Ratio K between the angle of travel direction θ and target value K·θ of the angle of travel direction may be set to a desired value.

If the ratio K is set to "1.0", the angle of travel direction θ and target value K·θ of the angle of travel direction equal each other; namely, when the steering operator member 202 has been turned rightward or clockwise through 180 degrees while the motor vehicle 207 is traveling northwards, the target value K·θ is changed to a value representative of a "southward" travel direction. If the ratio K is set to "0.5", and when the steering operator member 202 has been turned clockwise through 180 degrees while the vehicle 207 is traveling northward, the target value K·θ is changed to a value representative of a travel direction 90 degrees clockwise from the current travel direction (e.g., eastward travel direction).

The angle-of-travel-direction calculation section, including the angle calculation section 219 and angle gain section 220, includes a means for integrating a signal indicative of the yaw rate Y detected by the travel direction detection section 209, which generates a signal indicative of a current travel direction Kn·Ψ of the motor vehicle obtained on the basis of the yaw rate signal.

The offset calculation section 215 calculates an offset E between the signal indicative of the target value K·θ of the angle of travel direction output from the driver-designated angle corresponding section 214 and the signal indicative of the current travel direction Kn·Ψ output from the angle-of-travel-direction calculation section (angle calculation section 219 and angle gain section 220), to thereby supply a signal indicative of the calculated offset E (E=K·θ−Kn·Ψ) to the road-wheel steering angle calculation section (road-wheel steering angle designation section 216 and road-wheel steering angle control section 217).

The road-wheel steering angle calculation section (road-wheel steering angle designation section 216 and road-wheel steering angle control section 217) generates a signal indicative of a target road-wheel steering angle δ, on the basis of the signal indicative of the calculated offset E and the signal indicative of the detected vehicle velocity V This road-wheel steering angle calculation section includes a conversion table, for example in the form of a ROM, prestoring various target road-wheel steering angles δ preset in association with various possible offsets E and vehicle velocities V. Alternatively, the road-wheel steering angle calculation section may be arranged to calculate a target road-wheel steering angle δ on the basis of a pre-registered function expression or in any other suitable manner.

On the basis of the target road-wheel steering angle signal output from the road-wheel steering angle calculation section (road-wheel steering angle control section 217), the steering motor drive section 218 generates a drive signal for driving the steering motor 206. The steering motor 206 includes a gear mechanism etc. In a case where the steering motor 206 comprises a DC motor and the steering angle of the motor vehicle is controlled on the basis of a polarity and intensity value of a motor current to be supplied to the DC motor 206, the steering motor drive section 218 supplies the motor 206 with a predetermined motor current of a predetermined polarity corresponding to a target steering value δ. Where the steering motor 206 comprises a pulse motor, the steering motor drive section 218 is constructed to supply a necessary number of pulses for forward or reverse rotation of the pulse motor 206.

The steering resistive force calculation section (or steering resistive force setting section) 221 generates a signal indicative of a target resistive torque value T, on the basis of the angle offset E and vehicle velocity V. For this purpose, the steering resistive force calculation section 221 includes a conversion table, for example in the form of a ROM, prestoring various target resistive torque values T preset in association with various possible angle offsets E and vehicle velocities V. Alternatively, the steering resistive force calculation section 221 may be arranged to calculate a target resistive torque value T on the basis of a pre-registered function expression or in any other suitable manner.

The resistive motor drive section (or steering resistive force actuator drive section) 222 generates a drive signal for driving the resistive force generating motor 204.

The motor vehicle 207, integrator 208, front-gazing-point detection section 210, vehicle velocity detection section 211, integrator 212 and adder 213 shown in FIG. 12 are similar in construction and function to the motor vehicle 106, integrator 108, front-gazing-point detection section 109, vehicle velocity detection section 110, integrator 111 and adder 112 shown in FIG. 11.

In the conventional vehicle steering systems, the target road-wheel steering angle is set to be proportional to the steering angle of the steering operator member (i.e., driver-designated steering angle). However, because the steering angle of the steering operator member indicates an ultimate target control value in the techniques disclosed in Patent Document 1 and Patent Document 2, there has been a demand for a means which allows the vehicle driver to directly control the behavior of the vehicle by designating a desired angle of travel direction via the steering operator member, such as a means for controlling the vehicle with an enhanced accuracy in response to driver-designated angle of travel direction and in accordance with a changing road shape.

SUMMARY OF THE INVENTION

In view of the foregoing prior art problems, it is an object of the present invention to provide an improved steer-by-wire vehicle steering apparatus which can control steering of a vehicle with an increased accuracy.

To accomplish the above-mentioned object, the present invention provides an improved steer-by-wire vehicle steering apparatus, which comprises: a steering operator member operatively connected to a steerable road wheel via an electric wire; a drive section for steering the steerable road wheel, in response to operation of the via the steering operator member, by the electric wire; a detection section for detecting a steering angle of the steering operator member, an angle of travel direction of the vehicle and an actual steered angle of the steerable road wheel steered by the drive section; a control section for controlling the drive section in response to detection by the detection section in such a manner that the angle of travel direction of the vehicle and the steering angle of the steering operator member agree with each other; and a resistive force generation section for generating and imparting a steering resistive force to the steering operator member in accordance with the actual steered angle of the steerable road wheel detected by the detection section.

The resistive force generation section of the inventive vehicle steering apparatus may be arranged to set a steering resistive force proportional to a target road-wheel steering angle, in which case a vehicle driver can determine an appropriate turning radius on the basis of steering torque (steering resistive force) felt through the steering operator member. Alternatively, the resistive force generation section may be arranged to set a steering resistive force proportional to a product between a target road-wheel steering angle and a vehicle velocity, in which case the steering torque becomes proportional to a yaw rate and thus the vehicle driver can determine a yaw rate on the basis of the steering torque. In another alternative, the resistive force generation section may be arranged to set a steering resistive force proportional to a product between a target road-wheel steering angle and the square of a vehicle velocity, in which case the steering torque becomes proportional to the steering torque becomes proportional to lateral acceleration and thus the vehicle driver can steer the vehicle while monitoring the lateral acceleration on the basis of the steering torque. In this way, the vehicle drive can turn the vehicle in a target travel direction by increasing the designated angle of travel direction (steering angle of the steering operator member) until the target travel direction is reached while adjusting the steering force so as to achieve a desired motion of the vehicle. Namely, with the inventive steering apparatus, the vehicle driver can designate a travel direction of the vehicle on the basis of the steering resistive force felt through the steering wheel.

In a preferred form, the steering resistive force is varied in accordance with a velocity of the vehicle.

Desirably, the steering resistive force is varied in accordance with a product between a target road-wheel steering angle and a velocity of the vehicle.

Preferably, the steering resistive force is varied in accordance with a product between a target road-wheel steering angle and a square of a velocity of the vehicle.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
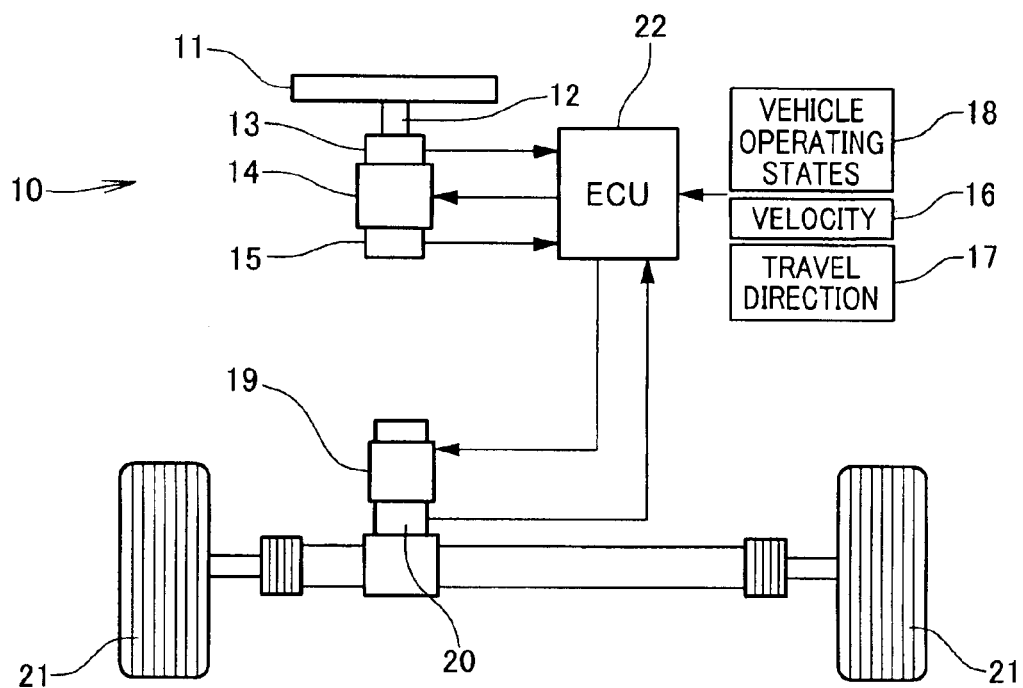
FIG. 1 is a schematic overall view of a motor vehicle employing a vehicle steering apparatus in accordance with an embodiment of the present invention.

FIG. 1 is a schematic view of a vehicle steering apparatus in accordance with an embodiment of the present invention.

The vehicle steering apparatus 10 of the invention includes a steering operator member 11, typically in the form of a steering wheel, which provides an angle-of-travel-direction input section of the steering apparatus, a steering shaft 12 connected to the steering operator member 11, and a designated angle detection section 13, resistive force generating motor 14 and torque sensor 15 provided on the steering shaft 12. The vehicle steering apparatus 10 also includes a vehicle velocity detection section 16, a travel direction detection section 17, a vehicle-operating-state detection section 18, a road-wheel steering angle generation section (steering motor) 19, an actual road-wheel-steering-angle detection section 20, steerable road wheels 21, and an electronic control unit (ECU) 22. The steering shaft 12 is rotatably supported, for example, on the body (not shown) of the motor vehicle.

The steering operator member 11, providing an angle-of-travel-direction input section, is operable by a human operator or driver of the motor vehicle to input a target angle of travel direction of the vehicle. In the case where the steering operator member 11 is the steering wheel, the vehicle driver turns the steering wheel so that an angle through which the steering wheel has been turned (i.e., steered angle of the steering wheel) is input as the target angle of travel direction.

The designated angle detection section 13 detects the target angle of travel direction input by the driver and thereby outputs a driver-designated steering angle θ (i.e., steering angle of the steering operator member or steering wheel) to the electronic control unit (ECU) 22. Specifically, the designated angle detection section 13 detects turning of the steering shaft 12 using, for example, a rotary encoder, and supplies the ECU 22 with a signal indicative of the target angle of travel direction (i.e., driver-designated steering angle θ) input by the vehicle driver via the steering operator member 11. Note that the designated angle of travel direction θ represents an azimuth angle measured from a predetermined reference position, such as the North or current traveling direction of the vehicle.

The resistive force generating motor 14 is controlled by the electronic control unit (ECU) 22 to impart a steering resistive force to the steering operator member 11 in accordance with an actual steered angle of the steerable wheels. Specifically, the resistive force generating motor 14, which includes a gear mechanism etc. (not shown), gives a steering resistive force corresponding to intensity of a motor current supplied from the ECU 22.

Torque sensor 15 detects steering torque applied via the steering operator member 11 and outputs a signal indicative of the detected steering torque to the ECU 22.

The vehicle velocity detection section 16 detects a velocity V of the motor vehicle 24 and supplies a signal indicative of the detected vehicle velocity V to the ECU 22. The travel direction detection section 17, includes a yaw rate gyro, navigation system, etc., detects a travel direction of the motor vehicle 24 and a signal indicative of the detected travel direction to the ECU 22.

The vehicle behavior detection section 18 detects operating states, such as a yaw rate Y and lateral acceleration, of the motor vehicle 24 and supplies signals indicative of the detected operating states to the ECU 22.

The steering motor 19 steers the steerable road wheels 21 on the basis of a steering drive signal supplied from the ECU 22.

The actual road-wheel-steering-angle detection section 20 detects an angle through which the steerable road wheels have been actually steered (i.e., actual steered angle of the road wheels 21) and supplies a signal indicative of the detected actual steered angle of the road wheels to the ECU 22.

On the basis of the signal indicative of the target angle of travel direction (i.e., driver-designated steering angle θ), signals indicative of other detected operating states, such as the yaw rate Y, lateral acceleration and vehicle velocity V, of the motor vehicle 24, the ECU 22 controls the polarity and intensity value of the motor current to thereby impart a steering resistive force to the steering operator member (steering wheel) 11, and it also controls the angle of travel direction Ψ of the vehicle in response to the driver-designated steering angle θ.

Figure 2:
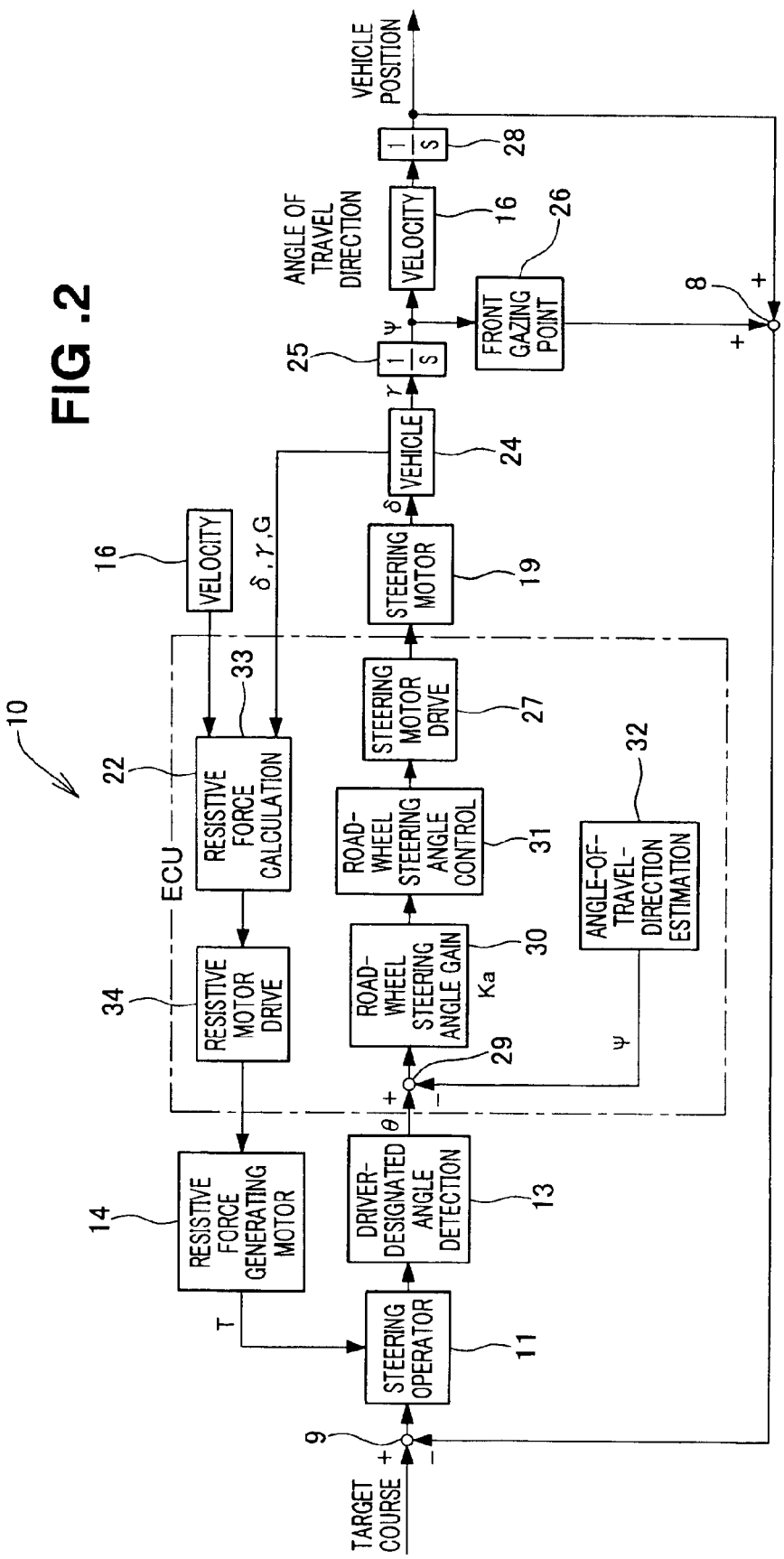
FIG. 2 is a block diagram showing a general hardware setup of a control device in the embodiment of the vehicle steering apparatus.

FIG. 2 is a block diagram showing a general hardware setup of the control device 10 employed in the embodiment of the vehicle steering apparatus. Namely, the control device 10 includes an offset calculation section 9, angle-of-travel-direction input section (i.e., steering operator member) 11, designated angle detection section 13, resistive force generating motor (or steering resistive force generating actuator) 14 and electronic control unit (ECU) 22. The control device 10 also includes a steering motor 19, integrator 25, front-gazing-point detection section 26, vehicle velocity detection section 16, other integrator 28 and adder 8. The electronic control unit 22 includes an offset calculation section 29, and a road-wheel steering angle calculation section including a road-wheel steering angle gain section 30 and road-wheel steering angle control section 31. The electronic control unit 22 further includes a steering motor drive section 27, angle-of-travel-direction calculation section (or angle-of-travel-direction estimation section) 32, steering resistive force calculation section 33 and resistive motor drive section (or steering resistive force actuator drive section) 34. The motor vehicle 24 includes the vehicle velocity detection section 16, yaw rate detection section, lateral acceleration section and actual road-wheel steering angle detection section 20. The steering resistive force generating motor 14, steering resistive force calculation section 33 and resistive motor drive section 34 together constitute a steering resistive force generation section.

The offset calculation section 9 calculates an offset between a target travel course set by the vehicle driver and a value obtained by adding a front point gazed by the vehicle driver (i.e., "front gazing point") detected by the front-gazing-point detection section 26 and a current position of the vehicle, and outputs a calculated offset, so that the driver can determine, on the basis of the thus-calculated offset in the travel course of the motor vehicle, how great the angle of travel direction to be input or designated should be.

The steering operator member 11, such as the steeling wheel, of the vehicle, is operable by the vehicle driver to input a target angle of travel direction. In the case where the steering operator member 11 is the steering wheel, an angle through which the driver has turned the steering wheel is input or designated as the target angle of travel direction. The designated angle detection section 13 detects the target angle of travel direction input or designated by the driver through the steering operator member 11 and thereby outputs a driver-designated steering angle θ to the offset calculation section 29 of the electronic control unit 22. The resistive force generating motor 14 is controlled by the electronic control unit 22 to impart a steering resistive force to the steering operator member 11 in accordance with an actual steered angle of the steerable road wheels.

The electronic control unit 22 generates a drive signal for driving the steering motor 19 on the basis of the driver-designated steering angle θ detected via the detection section 13, vehicle velocity detected by the vehicle velocity detection section 16, travel direction (yaw angle) detected by the travel direction detection section 17 and lateral acceleration detected by the lateral acceleration detection section, so that the steering motor 19 is driven in accordance with the thus-generated drive signal. Also, on the basis of the driver-designated steering angle θ, vehicle velocity, road-wheel steering angle, lateral acceleration and yaw rate, the electronic control unit 22 generates a drive signal for driving the resistive force generating motor 14.

The steering motor 19 includes a gear mechanism etc. In the case where the steering motor 19 comprises a DC motor and the steering angle of the motor vehicle 24 is controlled on the basis of the polarity and intensity value of the motor current to be supplied to the DC motor 19, the steering motor drive section 27 supplies the motor 19 with a predetermined motor current of a predetermined polarity corresponding to a target steering value δ. Where the steering motor 19 comprises a pulse motor, the steering motor drive section 27 is constructed to supply a necessary number of pulses for forward or reverse rotation of the pulse motor 19.

Travel direction of the motor vehicle 24 is varied in accordance with the target road-wheel steering angle δ generated by the steering motor 19, and resultant variation of the travel direction of the vehicle 24 produces a yaw rate Y in the vehicle. The thus-produced yaw rate Y is detected by the yaw rate detection section. The integrator 25 integrates the yaw rate Y to thereby output a current angle of travel direction Ψ of the motor vehicle 24. The front-gazing-point detection section 26 detects a front point gazed by the vehicle driver that is generally determined by the angle of travel direction Ψ output from the integrator 25, and it outputs a value pertaining to a position of the front gazing point to the adder 8. The vehicle velocity detection section 16 detects a traveling velocity of the motor vehicle 24 and outputs the detected velocity to the integrator 28. The integrator 28 integrates the vehicle velocity V to thereby output a signal pertaining to a current position of the motor vehicle 24. The adder 8 adds together the value pertaining to the position of the front gazing point output from the front-gazing-point detection section 26 and current position of the vehicle 24 output from the integrator 28, to thereby output a value representative of a current travel course of the vehicle.

Then, the vehicle driver inputs a target angle of travel direction of the vehicle 24 via the steering operator member 11. In response to the input target angle of travel direction, the control device 10 activates the steering motor 19 to impart a target road-wheel steering angle to the steerable wheels 21 of the vehicle 24, so that the travel direction of the vehicle 24 is varied and thus a yaw rate and lateral acceleration corresponding to the travel direction variation are produced. Then, the angle of travel direction of the vehicle 24 is controlled in accordance with a value obtained by the integrator 25 integrating the travel direction variation.

The angle-of-travel-direction estimation section 32 generates a signal indicative of a current travel direction Ψ of the vehicle 24 estimated on the basis of the signals output from the travel direction detection section 17 and vehicle behavior detection section 18.

The offset calculation section 29 calculates an offset E between the signal indicative of the target value θ of the angle of travel direction output from the driver-designated angle detection section 13 and the signal indicative of the current travel direction Ψ output from the angle-of-traveldirection estimation 32, to thereby supply a signal indicative of the calculated offset E (E=θ–Ψ) to the road-wheel steering angle gain section 30.

The road-wheel steering angle calculation section (including the road-wheel steering angle gain section 30 and road-wheel steering angle control section 31) generates a signal indicative of a target road-wheel steering angle δ, on the basis of the signal indicative of the calculated offset E and the signal indicative of the detected vehicle velocity V. For this purpose, the road-wheel steering angle calculation section includes a conversion table, for example in the form of a ROM, prestoring various target road-wheel steering angles δ preset in association with various possible offsets E and vehicle velocities V. Alternatively, the road-wheel steering angle calculation section may be arranged to calculate a target road-wheel steering angle δ on the basis of a pre-registered function expression or in any other suitable manner.

On the basis of the signal indicative of the target road-wheel steering angle δ output from the road-wheel steering angle calculation section, the steering motor drive section 32 generates a drive signal for driving the steering motor 19. The steering motor 19 includes a gear mechanism etc. In the case where the steering motor 19 comprises a DC motor and the steering angle of the motor vehicle 24 is controlled on the basis of the polarity and intensity value of the motor current to be supplied to the DC motor 19, the steering motor drive section 27 supplies the motor 19 with a predetermined motor current of a predetermined polarity corresponding to the target road-wheel steering angle value δ. Where the steering motor 19 comprises a pulse motor, the steering motor drive section 27 is constructed to supply a necessary number of pulses for forward or reverse rotation of the pulse motor 19.

The steering resistive force calculation section (or steering resistive force setting section) 33 generates a signal indicative of a target resistive torque value T, on the basis of the target road-wheel steering angle δ, yaw rate Y, lateral acceleration G and vehicle velocity V. For this purpose, this steering resistive force calculation section 33 includes a conversion table, for example in the form of a ROM, prestoring various target resistive torque values T preset in association with various possible target road-wheel steering angles δ, yaw rates Y, lateral acceleration G and vehicle velocities V. Alternatively, the steering resistive force calculation section 33 may be arranged to calculate a target resistive torque value T on the basis of a pre-registered function expression or in any other suitable manner.

The resistive motor drive section 34 generates a drive signal for driving the resistive force generating motor 14 on the basis of the target resistive torque value T output from the steering resistive force calculation section 33.

Now, a description will be given about behavior of the motor vehicle 24 controlled by the steering apparatus, with reference to a conceptual diagram of FIG. 3 and using theoretical expressions.

Figure 3:
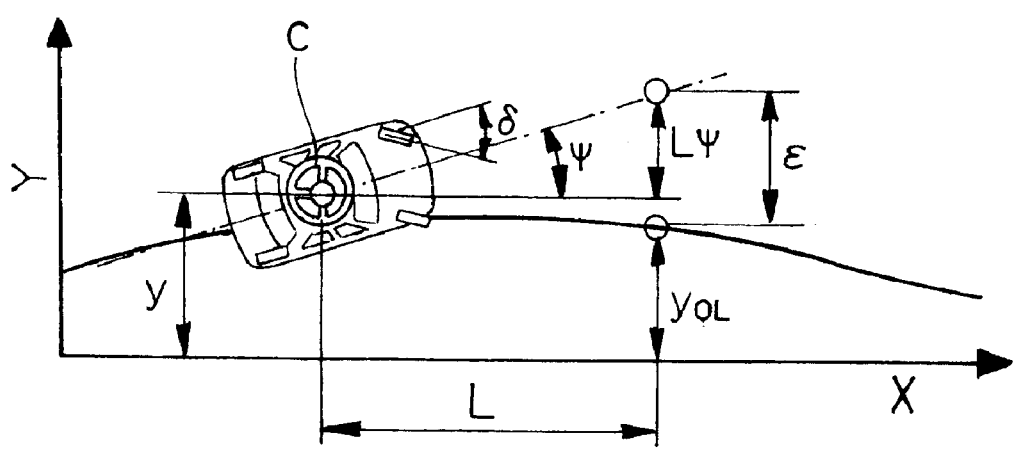
FIG. 3 is a conceptual view explanatory of motion or behavior of the motor vehicle.

In FIG. 3, there are shown plane coordinates (X, Y) set on a ground surface where the motor vehicle moves, and the x-coordinate at a center point C of the motor vehicle is defined as a "forward vehicle position" while the y-coordinate at the center point C of the vehicle is defined as a "lateral vehicle position". If the wheelbase of the motor vehicle is represented as "I", stability factor as "A", road-wheel steering angle gain as "Ka", driver F/B gain as "ha", front gazing point as "L" and lateral target travel course position as "yOL", the target road-wheel steering angle δ, yaw rate Y, angle of travel direction Ψ, vehicle velocity V, vehicle position and driver-designated steering angle θ can be expressed by theoretical expressions as follows.

For the conventional motor vehicles, the target road-wheel steering angle δ is expressed as a product between the road-wheel steering angle gain Kc and driver-designated steering angle θ, i.e. δ=Kc·θ. For the motor vehicle 24 subjected to the travel direction control by the inventive control device 10, the target road-wheel steering angle δ is expressed as a product between a difference between the driver-designated target steering angle θ and angle of travel direction ψ and the road-wheel steering angle gain Ka, i.e. Ka(θ–ψ). For both the conventional motor vehicles and the motor vehicle 24 controlled by the inventive control device 10, the yaw rate γ is expressed by $$\gamma = \frac{V}{1(1 + A \cdot V^2)} \cdot \delta$$
$$= \frac{V}{I} \cdot \delta$$

The angle of travel direction ψ is derived by integrating the yaw rate over time, i.e. ψ=∫γ dt. Forward component of the vehicle velocity V is expressed as a product between the cosine of the angle of travel direction tp and the vehicle velocity V, i.e.

$$\frac{dx}{dt} = V \cdot \cos\psi,$$

while a lateral component of the vehicle velocity V is expressed as a product between the sine of the angle of travel direction ψ and the vehicle velocity V, i.e.

$$\frac{dy}{dt} = V \cdot \sin\psi.$$

The forward vehicle position is determined by integrating the forward vehicle velocity. i.e. x =V·∫cosψdt, while the lateral vehicle position is determined by integrating the lateral vehicle velocity, i.e. y=V·∫sinψdt. Further, for both the conventional, motor vehicles and the motor vehicle 24 controlled by the inventive control device 10, the driver-designated steering angle θ is determined by subtracting, from a target lateral course position yOL, a product among the lateral vehicle position, from gazing point L and angle of travel direction ψ and then multiplying the subtraction result by the driver F/B gain, i.e.θ=hc(yOL–y–Lψ) orθ=ha(yOL–y–Lψ).

Reference is now made to FIGS. 4 and 6–10 showing in block diagrams various specific examples of the control device 10 in terms of the aforementioned theoretical expressions respecting the behavior of the motor vehicle 24.

Figure 4:
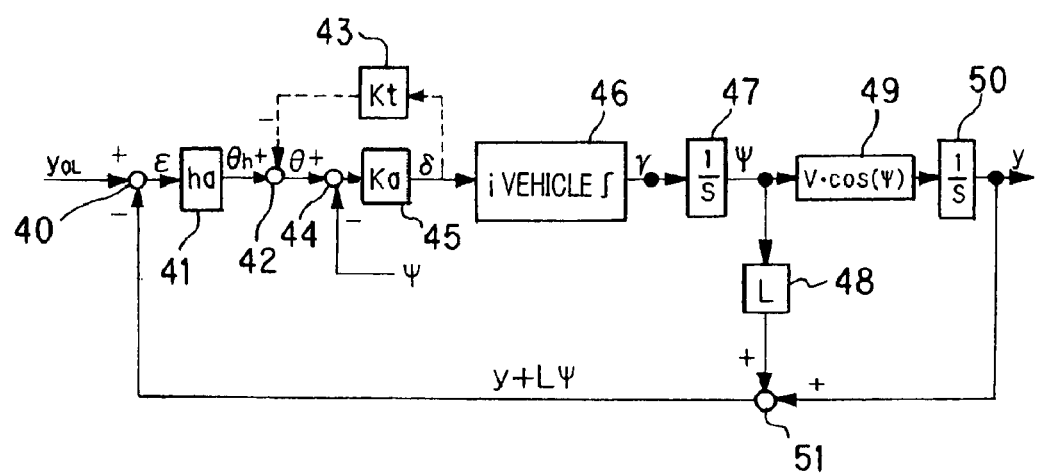
FIG. 4 is a block diagram explanatory of a first specific example of the control device in the embodiment of the vehicle steering apparatus.

FIG. 4 is a block diagram explanatory of a first specific example of the control device 10 where the steering resistive force is set to be proportional to the target road-wheel steering angle. In this specific example, an offset calculation section 40, which corresponds to the offset calculation section 9 of FIG. 2 and which is supplied with the target lateral course position, calculates a sum between the lateral vehicle position y and a product between the front gazing point L and angle of travel direction Ψ. The offset calculation section 40 subtracts, from the target lateral course position, the sum between the lateral vehicle position and the product between the front gazing point and angle of travel direction, and it generates a signal ε indicative of a calculated value of "yOL–y–L$_Ψ$".

Proportional calculator 41, which corresponds to the driver-designated angle detection section 13 of FIG. 2 and which is supplied with the signal ε indicative of the calculated value of "yOL−y−LΨ", multiplies the value of "yOL−y−LΨ" by the driver F/B gain hA to determine a driver-designated steering angle of the steering wheel, and it generates a signal θh indicative of the driver-designated steering angle.

Adder 42, which is supplied with the steering angle signal θh and a signal indicative of steering resistive torque from a proportional calculator 43 that corresponds to the resistive force calculation section 33, resistive motor drive section 34 and resistive force generating motor 14 of FIG. 2, generates a steering angle signal θ+.

Offset calculation section 44, which corresponds to the offset calculation section 29 of FIG. 2 and which is supplied with the steering angle signal θ+ and a signal indicative of an angle of travel direction Ψ, calculates a difference between the steering angle signal θ+ and angle-of-travel-direction signal Ψ (i.e., θ−Ψ).

Proportional calculator 45, which corresponds to the road-wheel steering angle gain section 30, road-wheel steering angle control section 31, steering motor drive section 27 and steering motor 19 of FIG. 2 and which is supplied with the signal ε indicative of the difference (θ−Ψ), calculates a product between the value (θ−Ψ) and the gain Ka to thereby determine a target road-wheel steering angle δ, and it generates a signal indicative of the target road-wheel steering angle δ.

Proportional calculator 43, which is supplied with the signal indicative of the target road-wheel steering angle δ, calculates a product between the target road-wheel steering angle δ and the gain Kt to thereby determine steering resistive torque T, and it generates a signal indicative of the steering resistive torque T.

The road-wheel steering angle determines motion of the motor vehicle 46 that corresponds to the motor vehicle 24 of FIG. 2, and the motion of the vehicle produces a yaw rate Y.

Integrator 47, which corresponds to integrator 25 of FIG. 2 and which is supplied with a signal indicative of the yaw rate Y, integrates the yaw rate Y to thereby calculate an angle of travel direction Ψ, and it generates a signal indicative of the angle of travel direction Ψ.

Proportional calculator 48, which corresponds to the front-gazing-point detection section 26 of FIG. 2 and which is supplied with the signal indicative of the angle of travel direction Ψ, calculates a product between the angle of travel direction Ψ and front gazing point L and generates a signal indicative of the calculated product LΨ.

Calculation section 49, which corresponds to the velocity detection section 16 of FIG. 2 and which is supplied with the signal indicative of the angle of travel direction Ψ, calculates a cosine of the angle of travel direction and a product between the cosine and the vehicle velocity V, and it generates a signal indicative of the calculated product V·cos (Ψ).

Integrator 50, which corresponds to the integrator 28 of FIG. 2 and which is supplied with the signal indicative of the product V·cos(Ψ), integrates the product V·cos(Ψ) to thereby determine a lateral position of the vehicle 46, and it generates a signal indicative of the determined lateral position y.

Adder 51, which corresponds to the adder 8 of FIG. 2 and which is supplied with the signals indicative of the product LΨ and lateral position y, calculates a sum between the two and generates a signal indicative of the sum (y+LΨ).

According to the first specific example, the vehicle driver estimates a deviation or offset in the travel course of the motor vehicle 46 from a desired travel course on the basis of the front gazing point, and he or she inputs an angle of travel direction via the steering operator member. The driver-input (i.e., driver-designated) angle of travel direction θ is detected by the driver-designated angle detection section 13. Angle of travel direction Ψ estimated by the angle-of-travel-direction estimation section 32 is subtracted from the detected driver-designated angle of travel direction θ, and the thus-calculated angle difference is multiplied by the road-wheel steering angle gain Ka. Then, the steering motor (or actuator) 19 generates a target road-wheel steering angle δ (δ=Ka(θ−Ψ)) via the road-wheel steering angle control section 31 and steering motor drive section 27.

Here, when the vehicle driver inputs or designates an angle of travel direction θ via the steering operator member as noted above, the resistive force calculation section 32 sets a steering resistive force on the basis of an actual steered angle of the steerable road wheels and other operating states of the motor vehicle 24, and the thus-set steering resistive force is applied via the resistive force generating motor 14 to the steering operator member so that the vehicle driver can feel steering torque even if the steering apparatus is of the steer-by-wire type.

Because the first specific example sets the steering resistive force proportional to the target road-wheel steering angle δ, it allows the vehicle driver to determine an appropriate turning radius of the motor vehicle 46 on the basis of steering torque (steering resistive force) felt through the steering operator member.

Figure 5:
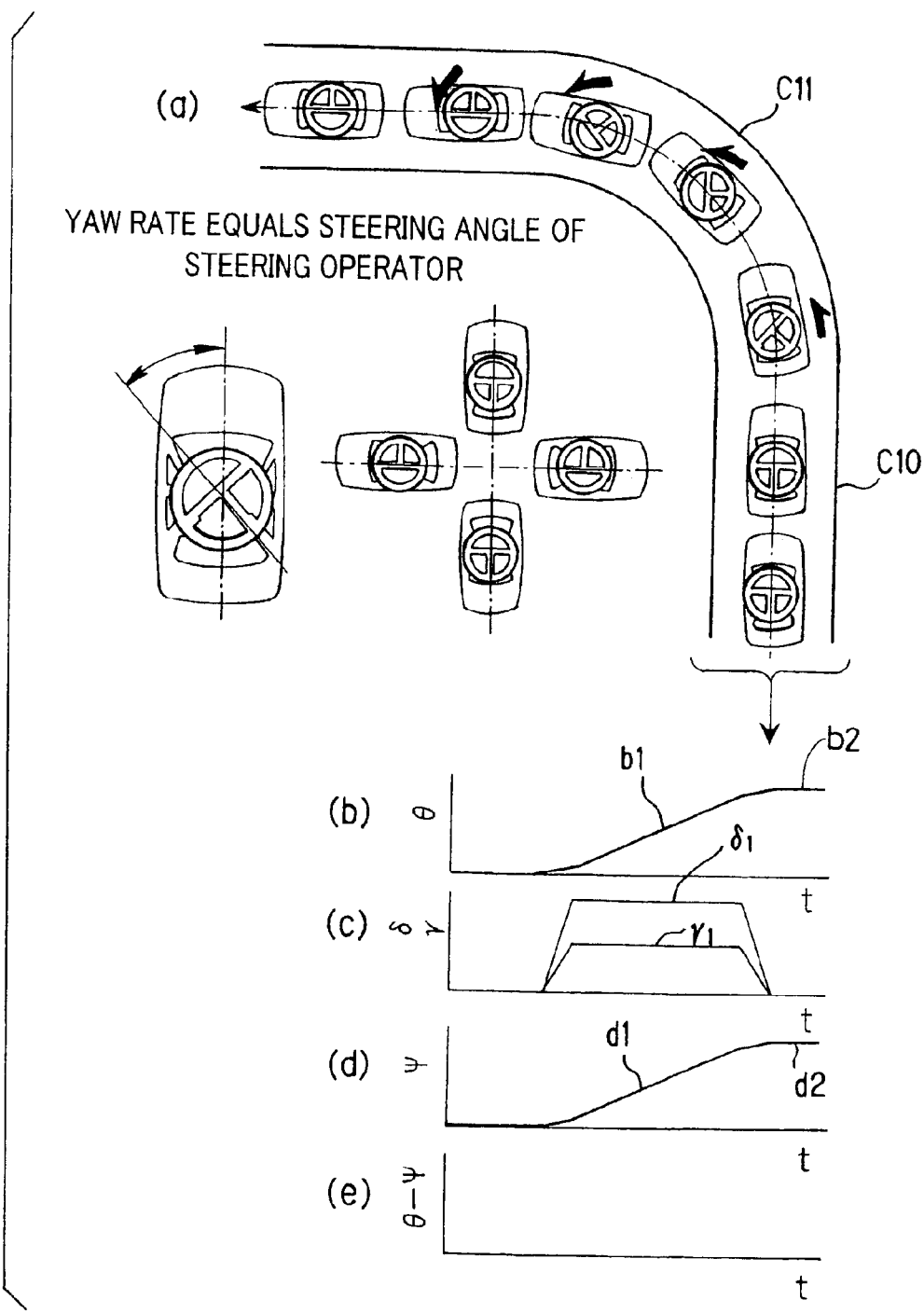
FIG. 5 is a view showing operation of the steering apparatus when the motor vehicle goes around a curve.

The first specific example of the control device 10 in the inventive steering apparatus operates as follows when the motor vehicle 46 goes around a curve as illustrated in FIG. 5.

As the vehicle approaches a curve as denoted at c10 in (a) of FIG. 5, the vehicle driver starts turning the steering wheel. At the curve c11, the vehicle driver gradually increases the steering angle of the steering wheel as illustrated by an upward straight line b1 in (b) of FIG. 5, at which time the steering angle and yaw rate remain at certain constant values δ1 and Y1 as illustrated in (c) of FIG. 5. In the meantime, the yaw angle gradually increases as illustrated by an upward straight line d1 in (d) of FIG. 5, and control is performed so as to eliminate a difference between the steering angle and the yaw angle as illustrated in (e) of FIG. 5. After the vehicle has passed the curve, the vehicle driver starts turning the steering wheel and then the steering angle of the steering wheel becomes constant as illustrated by a straight line b2 in (b), at which time the steering angle and yaw rate are reduced to zero as illustrated in (c) of FIG. 5. Also, the yaw angle becomes constant as illustrated by a straight line d2 in (d) of FIG. 5, and control is performed so as to eliminate the difference between the steering angle and the yaw angle as illustrated in (e) of FIG. 5. In this manner, the first specific example of the control device 10 performs control such that the steering angle of the steering wheel and yaw angle of the vehicle agree with each other.

Figure 6:
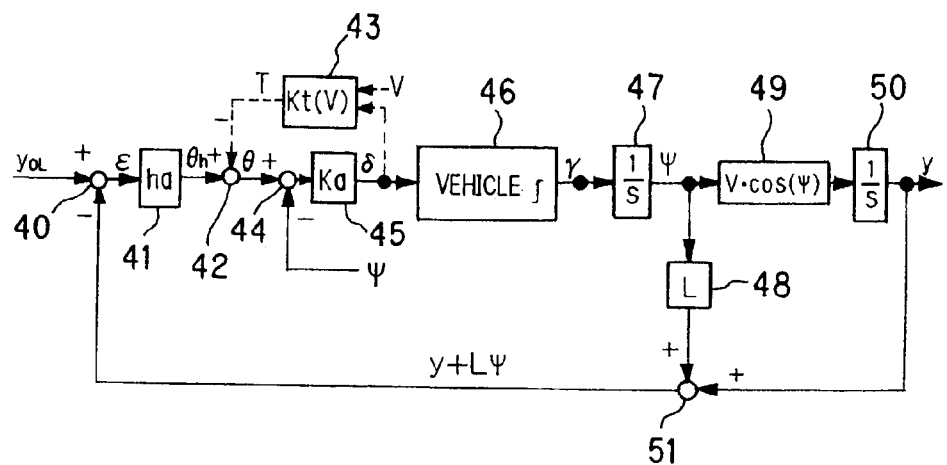
FIG. 6 is a block diagram explanatory of a second specific example of the control device in the embodiment of the vehicle steering apparatus.

FIG. 6 is a block diagram explanatory of a second specific example of the control device 10, which is similar to the first specific example but different therefrom in terms of the inputs to the steering resistive force calculation section. Elements in FIG. 6 represented by the same reference numerals as in FIG. 4 are similar in structure and function to the corresponding elements of FIG. 4 and will not be described here to avoid unnecessary duplication.

In the second specific example, the steering resistive force calculation section 43 generates a signal indicative of a target steering resistive torque T on the basis of a target road-wheel steering angle δ and vehicle velocity V. For this purpose, the steering resistive force calculation section 43 includes a conversion table, for example in the form of a ROM, prestoring various target resistive torque values T preset in association with various possible target road-wheel steering angles δ and vehicle velocities V. Alternatively, the steering resistive force calculation section 43 may be arranged to calculate a target resistive torque value T on the basis of a pre-registered function expression or in any other suitable manner. With the steering resistive force calculation section 43 thus arranged, the vehicle driver can determine an appropriate turning radius of the motor vehicle 46 on the basis of steering torque (steering resistive force) felt through the steering operator member.

Figure 7:
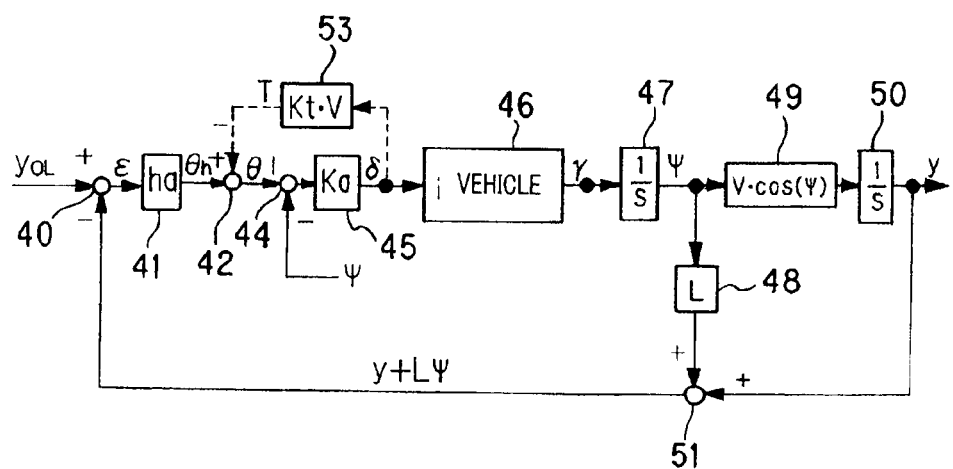
FIG. 7 is a block diagram explanatory of a third specific example of the control device in the embodiment of the vehicle steering apparatus.

FIG. 7 is a block diagram explanatory of a third specific example of the control device 10, which is similar to the first specific example but different therefrom in terms of the steering resistive force calculation section. Elements in FIG. 7 represented by the same reference numerals as in FIG. 4 are similar in structure and function to the corresponding elements of FIG. 4 and will not be described here to avoid unnecessary duplication.

In the third specific example, the steering resistive force calculation section 53 generates a signal indicative of a target steering resistive torque T proportional to a product between a target road-wheel steering angle δ and vehicle velocity V. For this purpose, the steering resistive force calculation section 53 includes a conversion table, for example in the form of a ROM, prestoring various target resistive torque values T preset in association with products between various possible target road-wheel steering angles δ and vehicle velocities V. Alternatively, the steering resistive force calculation section 53 may be arranged to calculate a target resistive torque value T on the basis of a pre-registered function expression or in any other suitable manner. With the steering resistive force calculation section 53 thus arranged, the steering torque becomes proportional to the yaw rate, so that the vehicle driver can determine an appropriate yaw rate on the basis of a combination of the steering assist torque applied by the steering motor and the steering resistive force imparted by the resistive force generating motor.

Figure 8:
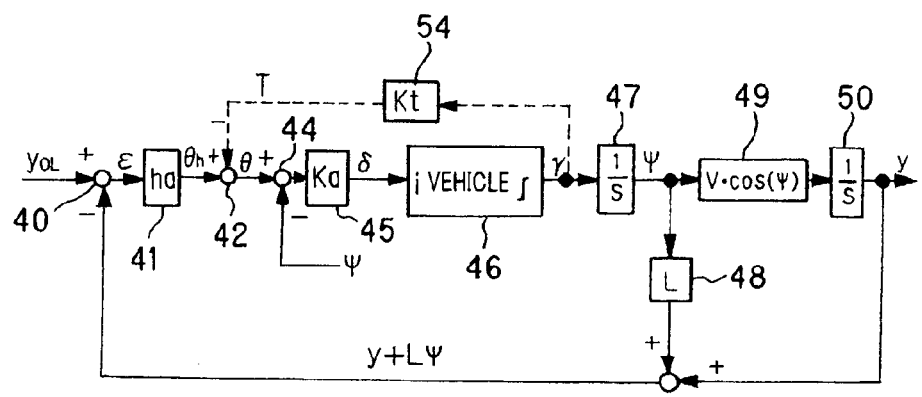
FIG. 8 is a block diagram explanatory of a fourth specific example of the control device in the embodiment of the vehicle steering apparatus.

FIG. 8 is a block diagram explanatory of a fourth specific example of the control device 10, which is similar to the first specific example but different therefrom in terms of the inputs to the steering resistive force calculation section. Elements in FIG. 8 represented by the same reference numerals as in FIG. 4 are similar in structure and function to the corresponding elements of FIG. 4 and will not be described here to avoid unnecessary duplication.

In the fourth specific example, the steering resistive force calculation section 54 generates a signal indicative of a target steering resistive torque T proportional to the signal indicative of the yaw rate Y. For this purpose, the steering resistive force calculation section 54 includes a conversion table, for example in the form of a ROM, prestoring various target resistive torque values T preset in association with various possible yaw rates Y. Alternatively, the steering resistive force calculation section 54 may be arranged to calculate a target resistive torque value T on the basis of a pre-registered function expression or in any other suitable manner. With the steering resistive force calculation section 54 thus arranged, the steering torque becomes proportional to the yaw rate, so that the vehicle driver can determine an appropriate yaw rate on the basis of a combination of the steering assist torque applied by the steering motor and the steering resistive force imparted by the resistive force generating motor.

Figure 9:
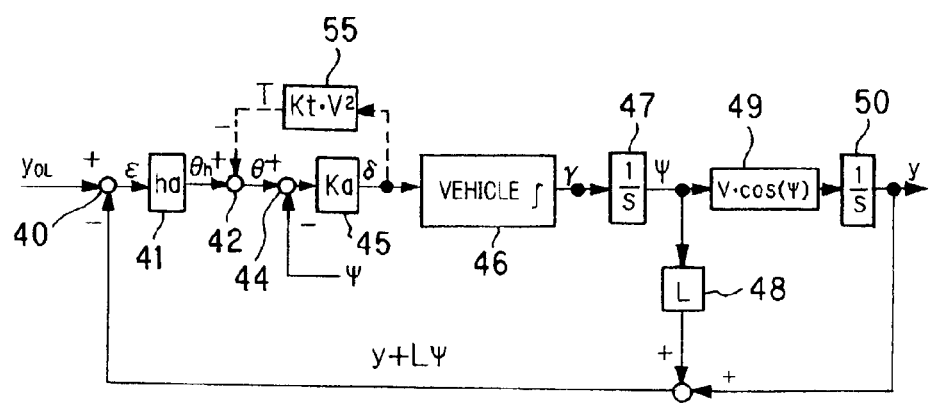
FIG. 9 is a block diagram explanatory of a fifth specific example of the control device in the embodiment of the vehicle steering apparatus.

FIG. 9 is a block diagram explanatory of a fifth specific example of the control device 10, which is similar to the first specific example but different therefrom in terms of the steering resistive force calculation section. Elements in FIG. 9 represented by the same reference numerals as in FIG. 4 are similar in structure and function to the corresponding elements of FIG. 4 and will not be described here to avoid unnecessary duplication.

In the fifth specific example, the steering resistive force calculation section 55 generates a signal indicative of a target steering resistive torque T proportional to a product between the square of the vehicle velocity V and the road-wheel steering angle δ output from the road-wheel steering angle gain section 30. For this purpose, the steering resistive force calculation section 55 includes a conversion table, for example in the form of a ROM, prestoring various target resistive torque values T preset in association with products between the squares of possible vehicle velocities V and possible road-wheel steering angles δ. Alternatively, the steering resistive force calculation section 55 may be arranged to calculate a target resistive torque value T on the basis of a pre-registered function expression or in any other suitable manner. With the steering resistive force calculation section 55 thus arranged, the lateral acceleration becomes proportional to the steering torque, so that the vehicle driver can steer the motor vehicle while monitoring the lateral acceleration from the steering torque.

Figure 10:
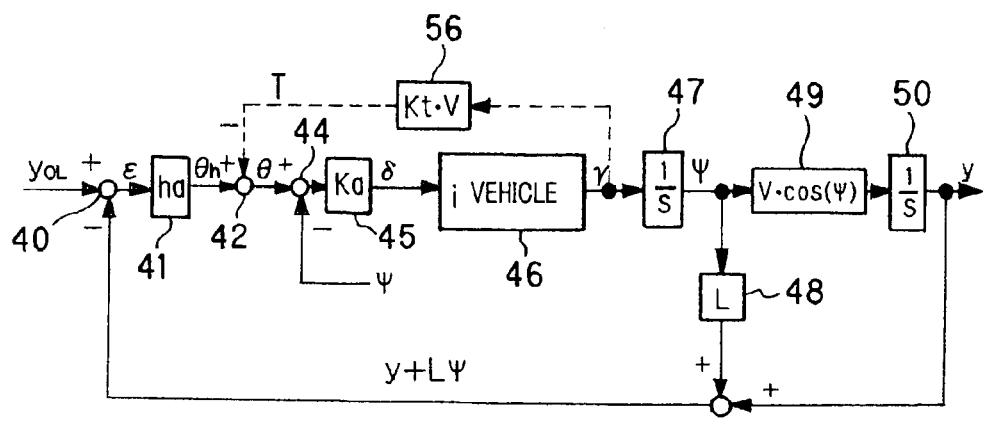
FIG. 10 is a block diagram explanatory of a sixth specific example of the control device in the embodiment of the vehicle steering apparatus.
Figure 11:
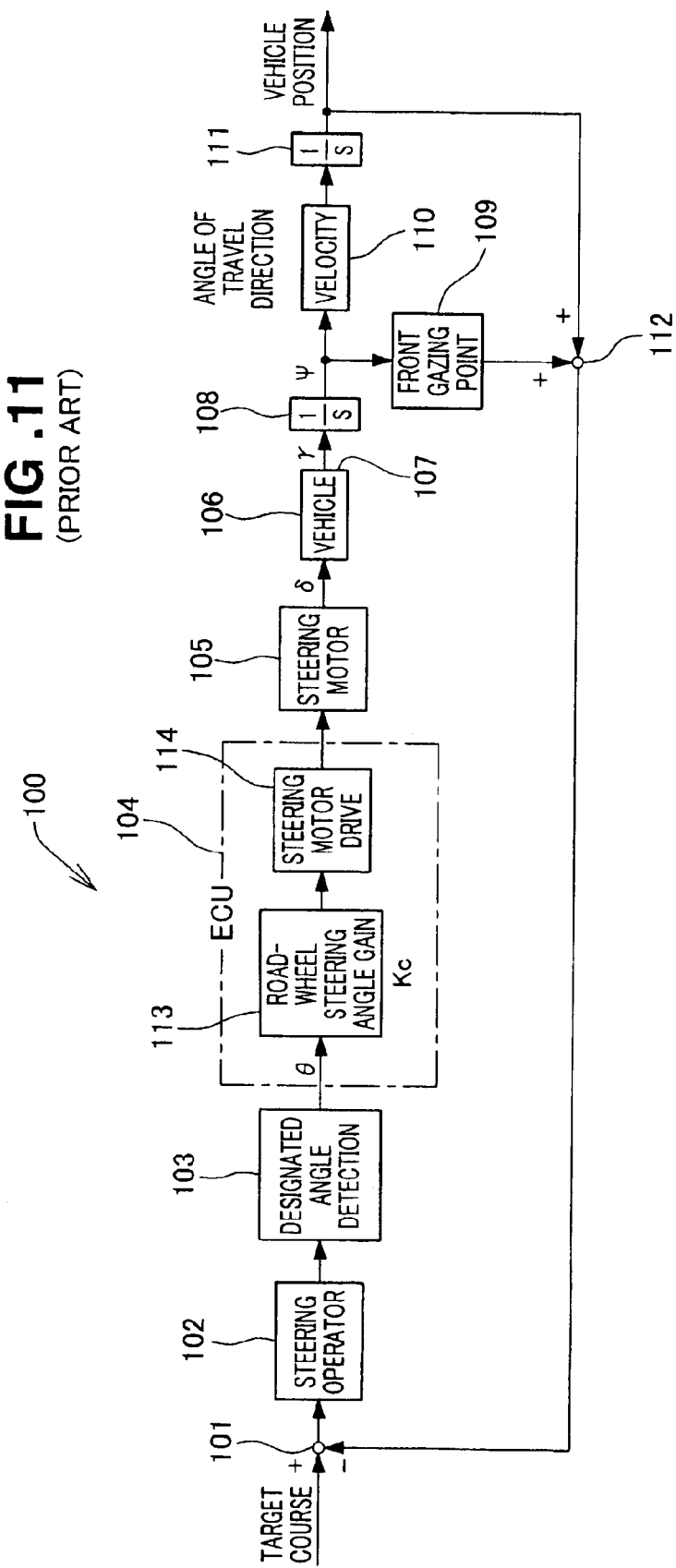
FIG. 11 is a block diagram showing a general hardware setup of a control device in a traditional vehicle steering apparatus.
Figure 12:
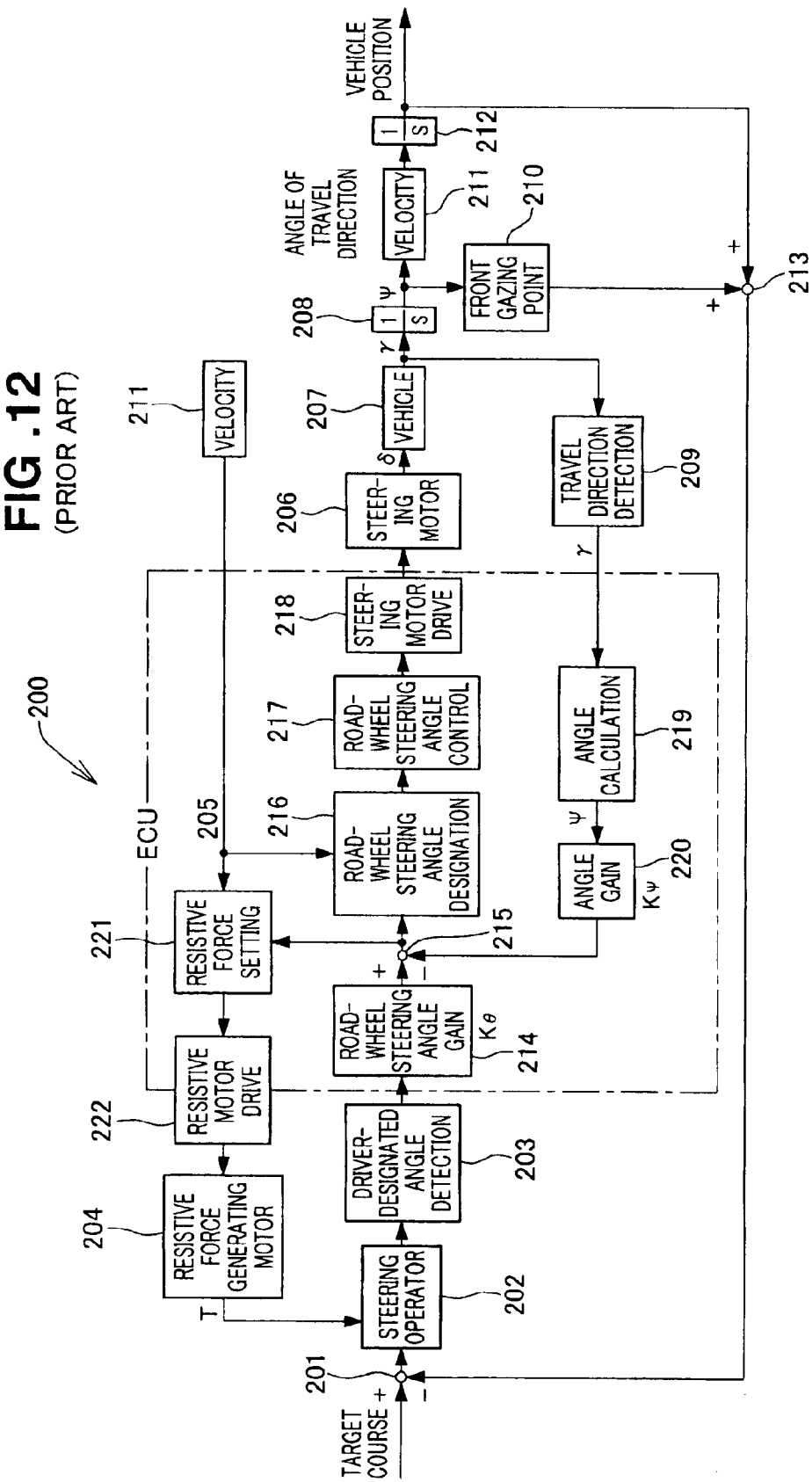
FIG. 12 is a block diagram showing a general hardware setup of a control device in prior art vehicle steering apparatus.

FIG. 10 is a block diagram explanatory of a sixth specific example of the control device 10, which is similar to the first specific example but different therefrom in terms of the steering resistive force calculation section. Elements in FIG. 10 represented by the same reference numerals as in FIG. 4 are similar in structure and function to the corresponding elements of FIG. 4 and will not be described here to avoid unnecessary duplication.

In the sixth specific example, the steering resistive force calculation section 56 generates a signal indicative of a target steering resistive torque T proportional to a product between the square of the yaw rate Y and the road-wheel steering angle δ output from the road-wheel steering angle gain section 30. For this purpose, the steering resistive force calculation section 56 includes a conversion table, for example in the form of a ROM, prestoring various target resistive torque values T preset in association with products between the squares of possible yaw rates Y and possible road-wheel steering angles δ. Alternatively, the steering resistive force calculation section 56 may be arranged to calculate a target resistive torque value T on the basis of a pre-registered function expression or in any other suitable manner. With the steering resistive force calculation section 56 thus arranged, the lateral acceleration becomes proportional to the steering torque, so that the vehicle driver can steer the motor vehicle while monitoring the lateral acceleration on the basis of the steering torque.

As having been set forth above in relation to the first to sixth specific examples, the vehicle drive can turn the motor vehicle in a target travel direction by increasing the designated angle of travel direction until the target travel direction is reached while adjusting the steering force so as to achieve a desired motion of the motor vehicle. Namely, with the inventive control device 10, the vehicle driver can designate a travel direction of the vehicle on the basis of the steering resistive force felt through the steering wheel.

It should be understood that, if there is provided a means for displaying an angle of travel direction, the basic principles of the present invention may be applied to any other steering operator members than the steering wheel, such as a steering level or button, that require no turning-back operation.

In summary, the present invention is characterized primarily by the provision of the resistive force generation section for generating and imparting a steering resistive force to the steering operator member in accordance with an actual steered angle of the steerable road wheels. With the resistive force generation section, the vehicle drive can accurately turn the vehicle in a target travel direction by just increasing the designated angle of travel direction until the target travel direction is reached while adjusting the steering force. Namely, with the vehicle steering apparatus of the invention, the vehicle driver can designate an appropriate travel direction of the vehicle on the basis of the steering torque (steering resistive force) felt through the steering wheel.

Obviously, various minor changes and modifications of the present invention are possible in the light of the above teaching. It is therefore to be understood that within the scope of the appended claims the invention may be practiced otherwise than as specifically described.

What is claimed is:

1. A steer-by-wire vehicle steering apparatus comprising;
   a steering operator member electrically operatively connected to a steerable road wheel;
   drive means for steering the steerable road wheel, in response to operation of said steering operator member, via an electric wire;
   detection means for detecting a steering angle of said steering operator member, an angle of travel direction of the vehicle and an actual steered angle of the steerable road wheel steered by said drive means;
   control means for controlling said drive section in response to detection by said detection means in such a manner that the angle of travel direction of the vehicle and the steering angle of said steering operator member agree with each other; and
   resistive force generation means for generating and imparting a steering resistive force to said steering operator member in accordance with the actual steered angle of the steerable road wheel detected by said detection means.

2. A steer-by-wire vehicle steering apparatus as claimed in claim 1 wherein the steering resistive force is varied in accordance with a velocity of the vehicle.

3. A steer-by-wire steering apparatus as claimed in claim 1 wherein the steering resistive force is varied in accordance with a product between a target road-wheel steering angle and a velocity of the vehicle.

4. A steer-by-wire vehicle steering apparatus as claimed in claim 1 wherein the steering resistive force is varied in accordance with a product between a target road-wheel steering angle and a square of a velocity of the vehicle.

* * * * *